US008687244B2

(12) United States Patent
Kato

(10) Patent No.: US 8,687,244 B2
(45) Date of Patent: Apr. 1, 2014

(54) IMAGE READING APPARATUS, METHOD OF CONTROLLING THE APPARATUS AND STORAGE MEDIUM

(75) Inventor: Kota Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 13/176,370

(22) Filed: Jul. 5, 2011

(65) Prior Publication Data
US 2012/0044541 A1 Feb. 23, 2012

(30) Foreign Application Priority Data

Aug. 17, 2010 (JP) ................................. 2010-182590

(51) Int. Cl.
*H04N 1/40* (2006.01)
(52) U.S. Cl.
USPC ............ 358/448; 358/488; 358/496; 358/498
(58) Field of Classification Search
None
See application file for complete search history.

(56) References Cited

U.S. PATENT DOCUMENTS

| | | | |
|---|---|---|---|
| 8,009,912 B2 * | 8/2011 | Tanaka ........................... 382/180 |
| 2003/0007196 A1 | 1/2003 | Ishimaru et al. .............. 358/486 |
| 2003/0090742 A1 * | 5/2003 | Fukuda et al. ................ 358/448 |
| 2006/0256398 A1 * | 11/2006 | Ishimaru et al. .............. 358/461 |
| 2009/0059277 A1 | 3/2009 | Murata et al. ................. 358/1.15 |
| 2010/0157386 A1 * | 6/2010 | Okumura ....................... 358/488 |

FOREIGN PATENT DOCUMENTS

| | | |
|---|---|---|
| CN | 101378435 | 3/2009 |
| CN | 101646003 | 2/2010 |
| EP | 1085746 A1 * | 3/2001 |
| JP | 2001-157053 | 6/2001 |
| JP | 2002-185725 | 6/2002 |
| JP | 2003-018363 | 1/2003 |

OTHER PUBLICATIONS

Chinese Office Action dated Nov. 22, 2013, in counterpart Chinese Patent Application No. 201110231943.1, and English translation thereof.

* cited by examiner

*Primary Examiner* — Mark K Zimmerman
*Assistant Examiner* — Richa Mishra
(74) *Attorney, Agent, or Firm* — Fitzpatrick, Cella, Harper & Scinto

(57) ABSTRACT

In a case where it is determined after reading an original that an abnormal pixel is included in image data generated by reading the original, after the original is reversed by a reversing unit for re-reading of the original by a reading unit, the original is conveyed to a reading position of the reading unit and image data generated by the re-reading of the reading unit is corrected.

12 Claims, 7 Drawing Sheets

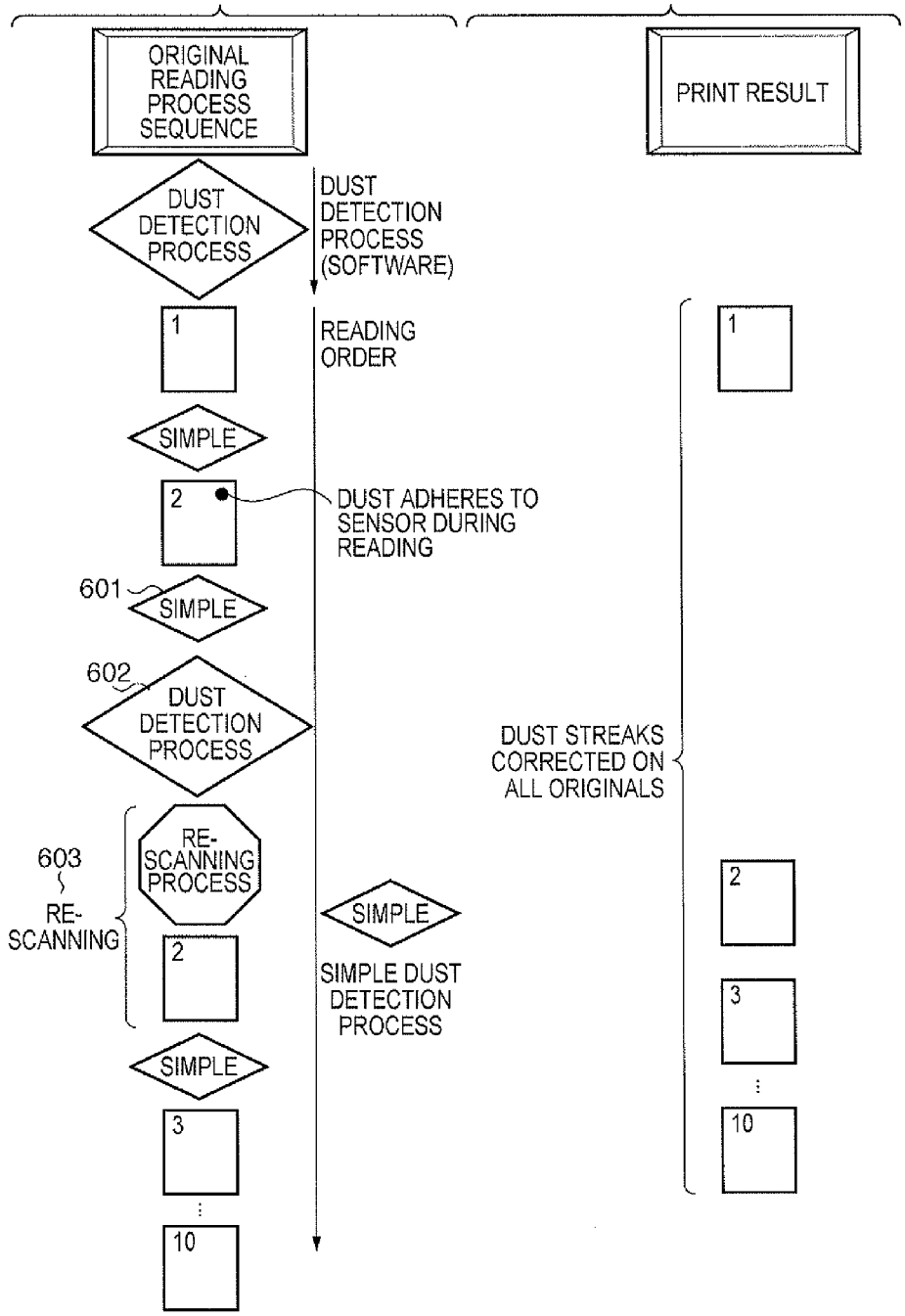

IMAGE READING APPARATUS, METHOD OF CONTROLLING THE APPARATUS AND STORAGE MEDIUM

BACKGROUND OF THE INVENTION

1. Field of the Invention

The present invention relates to image reading apparatuses that read an image of an original while transporting the original, to methods of controlling image reading apparatuses, and storage medium.

2. Description of the Related Art

Conventionally there are image reading apparatuses that use an automatic original transport device (automatic document feeder, hereinafter "ADF") to carry out "flowing document reading" in which multiple originals are read. When a foreign substance such as dirt, dust, or an abrasion or smearing (hereinafter "dust") adheres to a reading position of the original in the image reading apparatus, pixels in the area are distinguished as black pixels, thereby generating black streaks in the sub scanning direction (original feeding direction). As a technique for suppressing the generation of these black streaks, a technique relating to so-called dust correction in which dust adhering to a reading position of the original is detected and the black pixel data that has been generated by this dust is corrected in order to make the black streaks inconspicuous is known (Japanese Patent Laid-Open No. 2002-185725).

Dust detection is carried out immediately prior to reading each original, but there are cases where dust adheres to a reading position of the original while the original is being read. For example, there are cases where, during the reading of an original, dust that has adhered to the original then adheres onto a reading position at which a sensor reads the original. In this case, the detection of this adhered dust is carried out immediately prior to the reading of the next original after the original that was the cause of the dust adherence, and therefore dust correction can be carried out on the image data that has been read from the next original. However, the fact that dust correction cannot be carried out on the image data of the original that was the cause of the dust adherence during reading is a problem, as poor quality image data is obtained with black streaks remaining in the image data of the original.

SUMMARY OF THE INVENTION

An aspect of the present invention is to eliminate the above-mentioned problems with the conventional technology.

A feature of the invention of the present application is to provide a technique by which correction of image data of an original can be performed even in a case where dust has adhered to the original during reading.

According to an aspect of the present invention, there is provided an image reading apparatus, comprising: a conveying unit configured to convey an original, a reading unit configured to read the original conveyed by the conveying unit, a generation unit configured to generate image data corresponding to the original that has been read by the reading unit, a reversing unit configured to reverse the original that has been read by the reading unit, a determination unit configured to determine whether or not an abnormal pixel is included in the image data generated by the generation unit, a conveying control unit configured to, in a case where the determination unit has determined that an abnormal pixel is included, control the conveying unit so that after the original has been reversed by the reversing unit for re-reading of the original by the reading unit, the original is conveyed to a reading position of the reading unit, and a correction unit configured to cause the reading unit to read the original conveyed according to control by the conveying control unit and causes the generation unit to generate image data and corrects the image data.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a diagram for describing a reading sequence of originals according to the embodiment.

FIG. 6B is a diagram for describing a printing result example based on image data that has been read.

DESCRIPTION OF THE EMBODIMENTS

Embodiments of the present invention will be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention.

Figure 1:
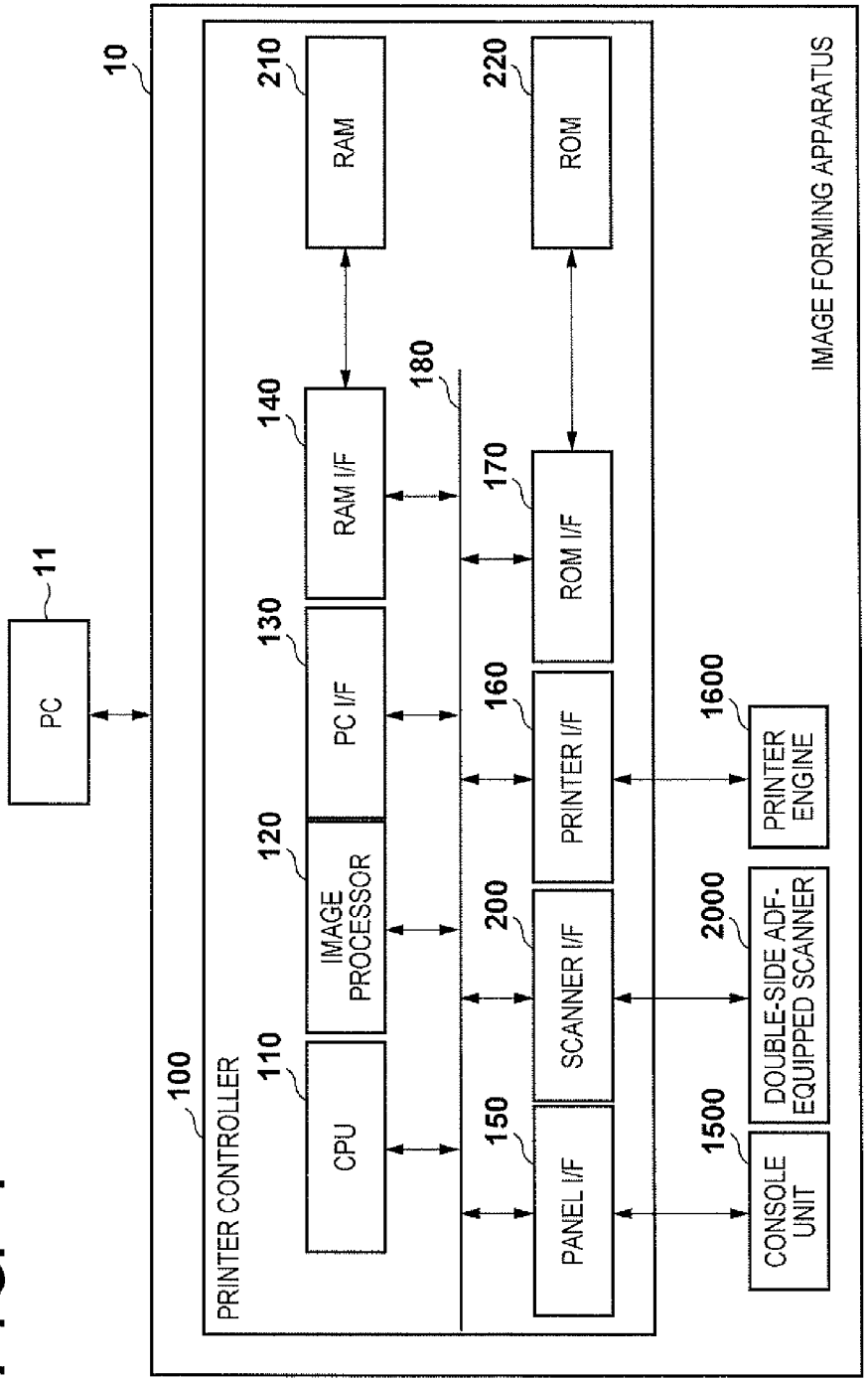
FIG. 1 is a block diagram showing a configuration of an image forming apparatus including an image reading apparatus according to an embodiment of the present invention.

FIG. 1 is a block diagram for describing a configuration of an image forming apparatus including an image reading apparatus according to an embodiment of the present invention.

In FIG. 1, numeral 10 denotes an image forming apparatus. A PC 11 is connected to the image forming apparatus 10 via a network or a PC interface such as USB. A printer controller 100 performs overall control of the image forming apparatus 10, and is provided with the following configuration.

A CPU 110 executes programs stored on a ROM 220 such that various types of control are executed by the controller 100 and the image forming apparatus 10 is comprehensively controlled. The controller 100 carries out transport control and reading control of originals by a double-side ADF-equipped scanner (hereinafter "scanner") 2000, and transport control and printing control of recording papers by a printer engine 1600. An image processor 120 executes various types of image processing for executing the print jobs received from the PC 11, and image processing on image data that has been read by the scanner 2000. A PC interface (I/F) 130 controls communications with the PC 11. A RAM interface 140 carries out exchanges of data with the RAM 210. A panel interface 150 carries out communications with a console unit 1500, which functions as a user interface (UI). A printer interface 160 carries image data transfers to and communications with a printer engine 1600. A ROM interface 170 carries out exchanges of data with the ROM 220. The system bus 180 connects the aforementioned units and the CPU 110. A scanner interface 200 inputs image data that has been read optically by the scanner 2000 and carries out communication with the scanner 2000. The RAM 210 provides an area for executing control programs, an area for work data for image processing, and a storage area for output data. The ROM 220 stores control programs and various types of data. The printer engine 1600 is a printer engine that carries out printing using an electrophotographic method for example. It should be noted that the printer engine 1600 is not limited to the printer engine of the present embodiment, and may be a printer engine of an inkjet printer, or the like, for example.

Figure 2:
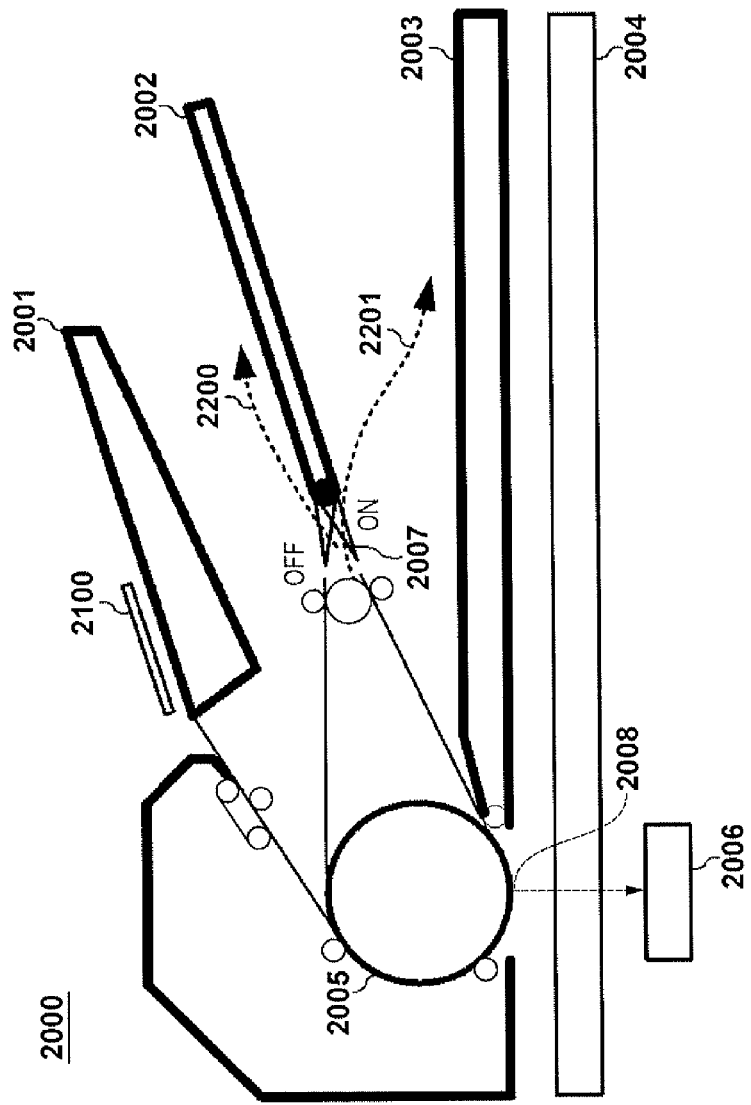
FIG. 2 is a diagram for describing a configuration of a double-side ADF-equipped scanner.

FIG. 2 is a diagram for describing a configuration of a scanner 2000.

In FIG. 2, a paper feed tray 2001 is capable of being loaded with multiple sheets of originals. A reversing tray 2002 is provided with a reversing route for reversing an original, and is used for reversing a surface to be read of an original when reading two sides of an original. A discharge tray 2003 receives and stacks originals for which reading has finished.

Originals 2100 that are loaded in the paper feed tray 2001 are fed sheet by sheet by a feed roller and a conveyance roller, then transported at a constant velocity due to the rotation of a driving roller 2005 to pass through a reading position 2008 of the original, after which the originals are discharged to the discharge tray 2003. During transport of the original, an image sensor 2006 inputs reflected light from the original at the reading position 2008 to generate main scanning direction image signals. The image signals are converted to digital signals then undergo image processing by the image processor 120 by way of the scanner I/F 200 in the printer controller 100. Numeral 2004 denotes a platen glass. In the present embodiment, since the originals are read using flowing document reading, a description is omitted relating to the reading of originals using this platen glass 2004.

Numeral 2007 denotes a separation pawl, which fulfills the role of a switch for switching the destination of transport of the original 2100 that has been transported by the driving roller 2005 to either a reversing tray 2002 or the discharge tray 2003. Numeral 2200 denotes a path along which the original moves when the original 2100 is transported to the reversing tray 2002. When the separation pawl 2007 is switched to a position indicated by ON, the original 2100 transported by the rotation of the driving roller 2005 is transported to the reversing tray 2002. Furthermore, when the separation pawl 2007 is switched to a position indicated by OFF, the original 2100 transported by the rotation of the driving roller 2005 is transported to the discharge tray 2003 as indicated by numeral 2201.

Figure 3:
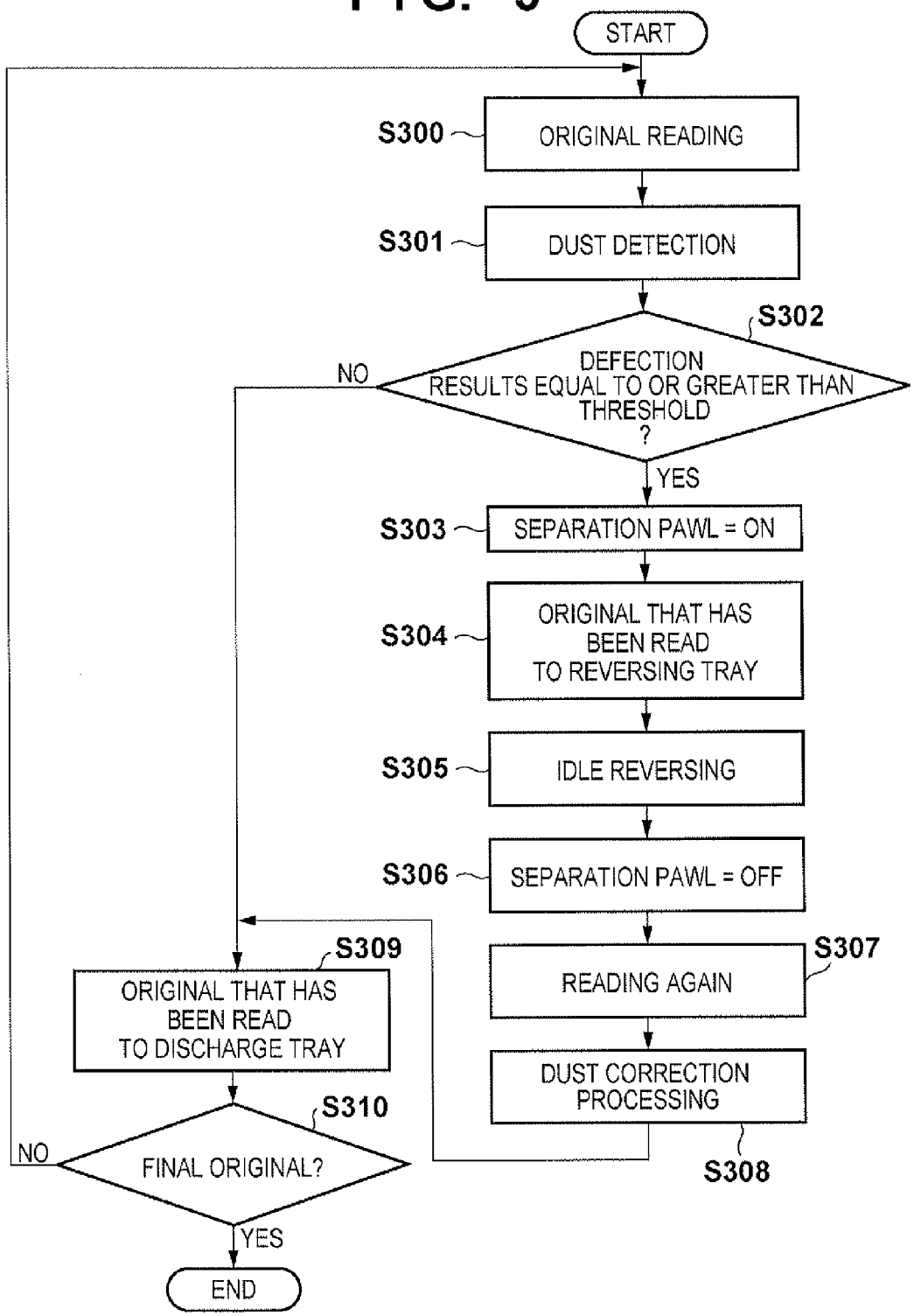
FIG. 3 is a flowchart for describing a control process of a printer controller according to the embodiment.

Next, description is given with reference to FIG. 3 of an operation according to the embodiment of the present invention.

FIG. 3 is a flowchart for describing a control process of the printer controller 100 according to the embodiment of the present invention. The operational procedures shown in this flowchart are achieved by the CPU 110 executing programs that have been expanded in the RAM 210 of the printer controller 100 or programs that are stored in the ROM 220.

In step S300, the CPU 110 reads a first original 2100 using the scanner 2000. The original 2100 placed on the paper feed tray 2001 is transported by the driving roller 2005. An image of the transported original is read by the image sensor 2006. The scanner 2000 generates image data in accordance with the image data of the original that has been read. This image data is stored in the RAM 210 by way of the scanner I/F 200. Next, the procedure proceeds to step S301 and the CPU 110 detects for a presence/absence of an abnormal pixel originating from a foreign substance (hereinafter known as "dust") such as dirt or dust that has adhered to the reading position 2008 of the original. This is referred to as dust detection. The dust detection is carried out in the following manner. In a state in which no original is present at the reading position 2008 of originals, the scanner 2000 reads a white reference plate (white image) that is positioned at an upper surface of the reading position 2008 of the originals, and detects whether or not black pixel data is present in the image data that has been read. This dust detection may be carried out by the image processor 120, which is hardware, or may be carried out according to a program that is expanded in the RAM 210 and executed by the CPU 110. According to this dust detection, the CPU 110 determines the positions of pixels for which dust correction is to be carried out and stores these positions in the RAM 210.

Next, the procedure proceeds to step S302 where the CPU 110 determines whether or not the dust detection result for the original that has been read in step S300 exceeds a threshold for dust detection that has been set in advance by the user. For example, the CPU 110 determines, in the image data of the original that has been read in step S302, whether or not the number of abnormal pixels exceeds a predetermined number. Alternatively, the CPU 110 may determine, in the image data of the original that has been read in step S302, whether or not a sum of density values of abnormal pixels is equal to or greater than a predetermined value. In a case where the threshold is exceeded according to these methods (where the number of abnormal pixels is equal to or greater than the predetermined number or the density value of abnormal pixels is equal to or greater than the predetermined value), the process proceeds to step S303, but in a case where the threshold is not exceeded, it determines that the original has been read normally and proceeds to step S309. The threshold is a value for determining whether or not the effect of the size or the like of the detected dust is of an extent that can be ignored from the perspective of the quality of image data that has been read. Accordingly, when it is determined that the threshold has not been exceeded, the image data that has been obtained by reading is processed without dust correction being carried out, which is the same as a case of no dust.

On the other hand, in a case where the effect of dust cannot be ignored, the CPU 110 generates data (dust correction data) indicating the position of the dust based on the image data of the original used in the detection of the dust, and stores the data in the RAM 210. Then the procedure proceeds to step S303 and the CPU 110 switches the separation pawl 2007 to the position indicated by ON in FIG. 2. Next, the procedure proceeds to step S304 and the driving roller 2005 is caused to rotate such that the original 2100 that has been read is transported to the reversing tray 2002. Here, since the separation pawl 2007 has been switched to the position indicated by ON, the original that has been read is transported not to the discharge tray 2003, but rather to the reversing tray 2002. Then the procedure proceeds to step S305 and the CPU 110 carries out reversing processing, which is described later, to reverse the front and back of the original. Then the procedure proceeds to step S306 and the CPU 110 switches the separation pawl 2007 to the position indicated by OFF in FIG. 2. Next the procedure proceeds to step S307, and the original whose front and back has been reversed on the reversing tray 2002 is again read by the image sensor 2006. Next, the procedure proceeds to step S308, and the dust correction processing is carried out on the image data obtained in step S307 by reading the original. Here, dust correction is carried out in which the pixel data of the dust areas is corrected based on the dust correction data stored in the RAM 210 in step S303. Then, the corrected image data is substituted for the image data in the RAM 210 stored in step S300. Then the procedure proceeds to step S309. It should be noted in regard to the correction processing in step S308 that the CPU 110 corrects the pixel data of the image data corresponding to the data that indicates the positions of dust using the pixel data that is adjacent to the pixel data in the main scanning direction. For example, the CPU 110 copies the pixel data that is neighboring the pixel data in the main scanning direction for pixel data of the image data corresponding to the data that indicates the positions of dust.

In step S309, the CPU 110 causes the driving roller 2005 to rotate such that the original 2100 that has been read is transported to the discharge tray 2003. At this time, the separation pawl 2007 is as it is in the position indicated by OFF in FIG. 2. That is, in a case of proceeding directly from step S302 to step S309, the separation pawl 2007 stays as it is in the position indicated by OFF. Furthermore, in a case of proceeding from step S308 to step S309, the separation pawl 2007 is switched to the position indicated by OFF in step S306. Thus, in step S309, the original is transported not to the reversing tray 2002 but to the discharge tray 2003. Next, in step S310, according to information from an unshown original detecting sensor (which detects whether or not an original is in the paper feed tray 2001), the CPU 110 determines whether or not the final original has been read. When an original is present in the paper feed tray 2001, the procedure transitions to step S300, and in a case where there is no original in the paper feed tray 2001, processing finishes.

FIGS. 4A to 4D are diagrams for describing the reversing operation of the original carried out in step S305 in FIG. 3. It should be noted that in FIGS. 4A to 4D, portions common to FIG. 2 are shown using identical reference numerals.

Figure 4A:
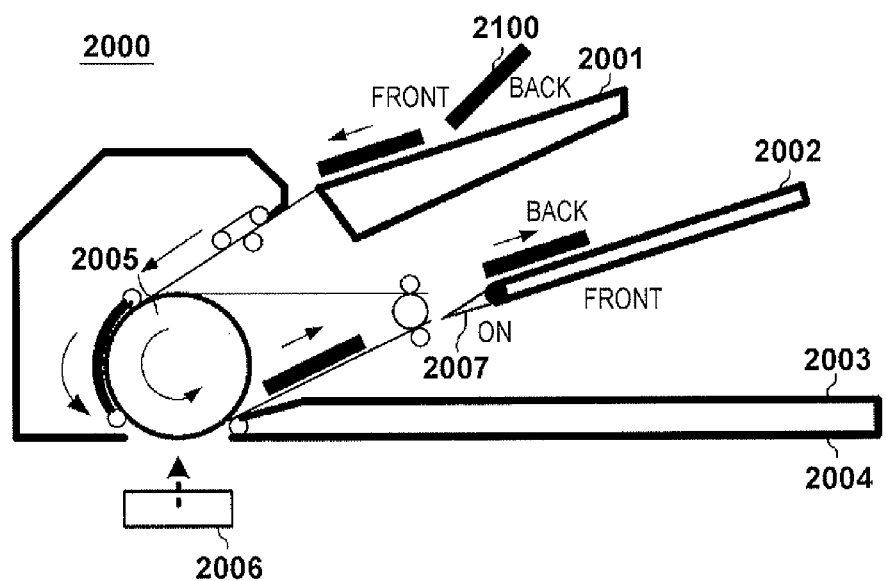
FIGS. 4A to 4D are diagrams for describing a reversing operation carried out at S305 in FIG. 3.

FIG. 4A is a diagram showing a state in which the original 2100 has been conveyed to the reversing tray 2002 in step S304 in FIG. 3. The arrows indicate the direction in which the original advances. Here, since the front surface of the original 2100 is the target surface for reading, when the original that has been sent to the reversing tray 2002 is again transported as it is to the reading position of originals, undesirably the back surface of the original 2100 is read.

Figure 4B:
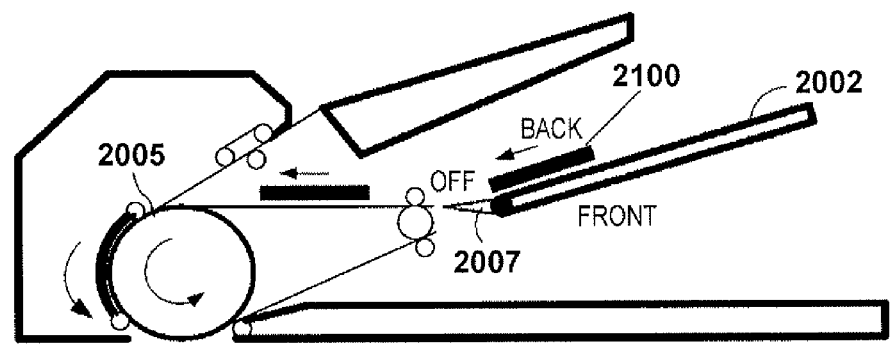

FIG. 4B is a diagram showing a state in which the reversing operation of the original commences. Here, the separation pawl 2007 is switched to the position indicated by OFF, and the conveyance roller 2005 is rotated to transport the original 2100.

Figure 4C:
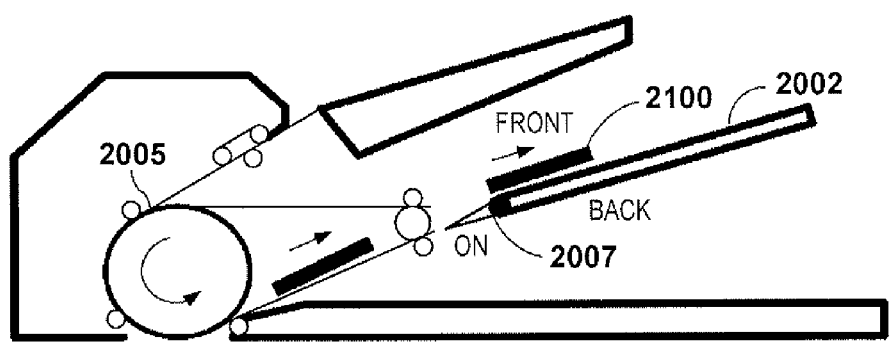

FIG. 4C is a diagram showing a state in which the reversing operation has been completed. Here, the separation pawl 2007 is switched to the position indicated by ON, and the original 2100 is transported to the reversing tray 2002. Due to this, the original 2100 is placed on the reversing tray with its front surface facing up.

Figure 4D:
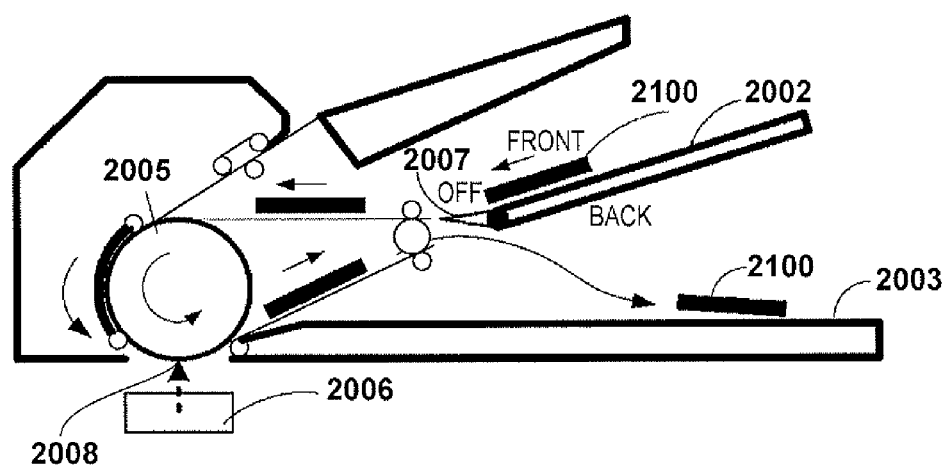

FIG. 4D is a diagram showing a state in which reading is being carried out by again transporting the original 2100 on the reversing tray 2002 to the reading position 2008 of originals using the rotation of the conveyance roller 2005. Here, the separation pawl 2007 switches to the position indicated by OFF. Thus the original that is again read by the image sensor 2006 is transported to the discharge tray 2003.

In this way, in a case where it has been determined abnormal pixels are included during reading of an original, the image reading apparatus reverses that original using the reversing tray 2002 so as to read that original again. The thus-reversed original is again transported to the reading position 2008 and read by the image sensor 2006.

Figure 5:
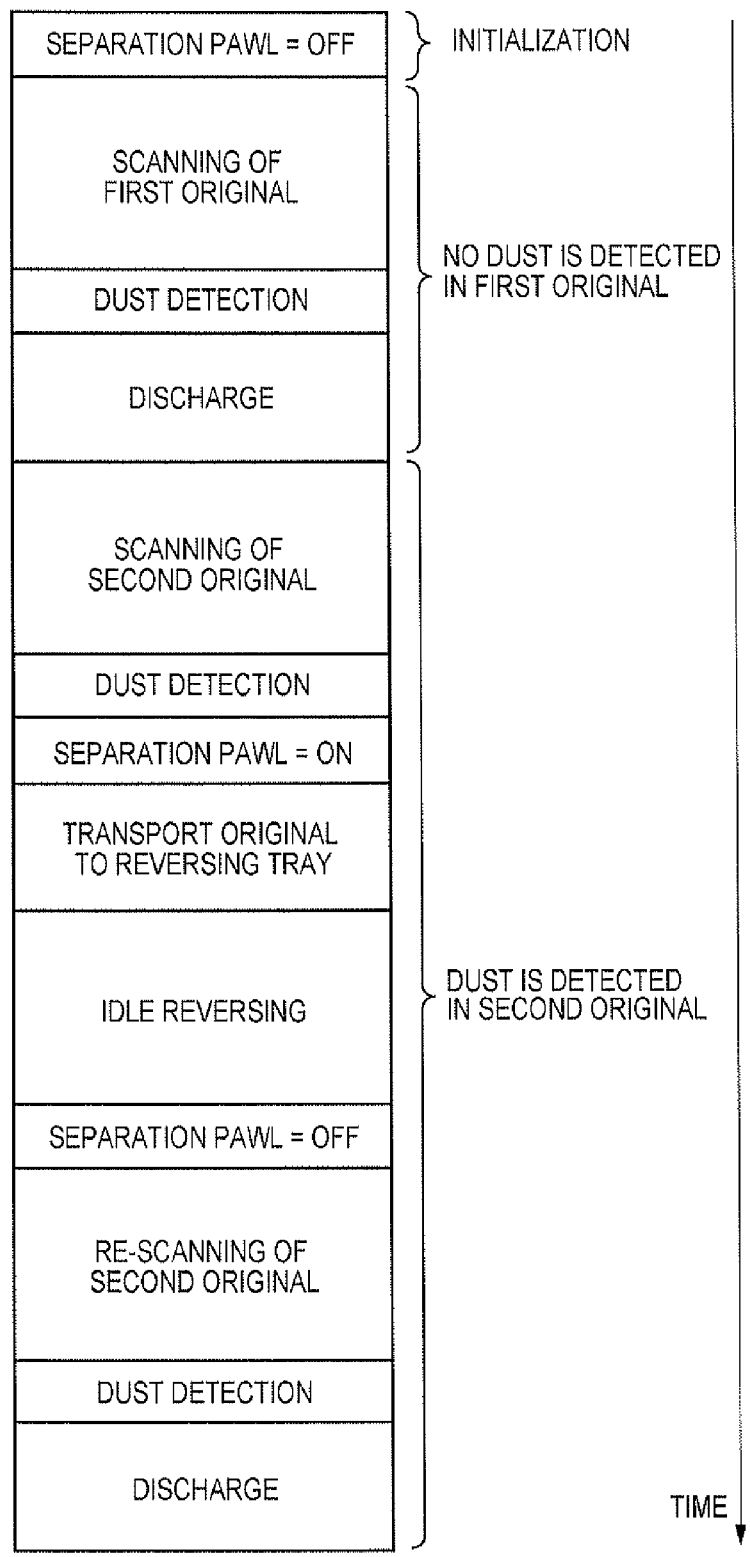
FIG. 5 is a diagram for describing a specific sequence of an operation according to the present working example on a time axis.

FIG. 5 is a diagram for describing a specific sequence of the above-described operation on a time axis.

FIG. 5 shows a case where a result of dust detection is that a first original does not exceed the threshold for dust detection, that is, a case where the effect of the dust can be ignored. In this case, after the first original is read and dust detection has been executed, the image data obtained by that reading is stored in the RAM 210, and the process proceeds to the reading of a next (second) original. This corresponds to the case in FIG. 3 where the procedure proceeds from step S302 to step S309 and the first read original is discharged and the procedure returns to step S300.

In contrast to this, in the dust detection after the second original has been read, the result of the dust detection is that the threshold is exceeded. For this reason, the procedure proceeds from step S302 to step S303 in FIG. 3 such that the separation pawl 2007 is switched to the position indicated by ON, and the original is transported to the reversing tray 2002. And as described with reference to FIGS. 4A to 4D, after the original is turned over and placed on the reversing tray 2002, the separation pawl 2007 returns to the position indicated by OFF. Then, the second original on the reversing tray 2002 is transported (re-sent) to the reading position 2008 for reading (in step S307). Then, the image data of the original that has been read is corrected based on the dust detection data after the second original has been read (in step S308). Then, the second original, for which reading has been completed, is discharged to the discharge tray 2003.

FIG. 6A is a diagram for describing the reading sequence of originals described above, and FIG. 6B is a diagram showing a printing result example based on the image data thereof that has been read.

FIG. 6A shows a case where the adherence of dust has been detected in a simple dust detection test 601 after the second original has been read. In this case, the second original is re-read at 603 and the image data obtained by that reading is corrected based on dust detected data that was detected at a dust detection process 602.

It should be noted that in FIG. 6A, a software-based dust detection process is executed immediately prior to the reading of the first original and if dust is detected here, the image data obtained by the reading of the first original is corrected based on the dust detected data thereof.

FIG. 6B shows a printing result based on image data that has been read in the sequence shown in FIG. 6A. In this way, dust correction can also be executed on the image data of the second original on which dust has adhered during reading, and therefore it is possible to prevent a drop in the quality of the image data of the second original which has been affected by dust.

According to the present embodiment described above, in a case where dust has adhered to the reading position of the original during reading of the original, the original is re-read and the image data of the original that has been read can then be corrected based on the dust detected data thereof, and therefore image data of the original can be obtained in which the effect of the dust is removed.

It should be noted that when reading an original subsequent to the second original for which adherence of dust has been detected, there is a risk that the position of that dust may vary and therefore detailed dust detection processing (the dust detection process 602 of FIG. 6A) may be carried out prior to reading each of the originals until the dust stops being detected.

Furthermore, in regard to the simple dust detection test 601 of FIG. 6A, this is a simple dust detection process that is executed prior to reading each original and is for determining the presence/absence of dust (black pixels) and whether or not the quantity of the black pixels is equal to or greater than the threshold. And when it is determined that dust equal to or greater than the threshold is adhering in the simple dust detection test 601, the CPU 110 accurately calculates the position and quantity of that dust to execute the dust detection process 602 for obtaining dust correction data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-182590, filed Aug. 17, 2010, which is hereby incorporated by reference herein in its entirety.

What is claimed is:

1. An image reading apparatus, comprising:
 a conveying unit configured to convey an original;
 a reading unit configured to read the original conveyed by the conveying unit and then to read a reference plate;
 a generation unit configured to generate original image data corresponding to the original read by the reading unit and to generate reference image data corresponding to the reference plate read by the reading unit;
 a reversing unit configured to reverse surfaces of the original read by the reading unit;
 a determination unit configured to determine whether or not an abnormal pixel is included in the reference image data generated by the generation unit;
 a storing unit configured to store position information indicating a position of the abnormal pixel in a case that the determination unit determines that the abnormal pixel is included;
 a conveying control unit responsive to a determination that an abnormal pixel is included in the reference image data, such that with respect to an original read by the reading unit just before the reference plate is read by the reading unit, the conveying control unit is configured to control the reversing unit to reverse the surfaces of such original and to control the conveying unit to convey such original which has been reversed to a reading position of the reading unit for re-reading of the original by the reading unit; and
 a correction unit configured to cause the reading unit to re-read the original conveyed according to control by the conveying control unit, to cause the generation unit to generate re-read original image data corresponding to the original re-read by the reading unit, and to correct the abnormal pixel included in the re-read original image data generated by the generation unit with reference to the position information stored in the storing unit.

2. The image reading apparatus according to claim 1, wherein the reversing unit receives the original read by the reading unit on a reversing tray, then conveys the original from the reversing tray to the reading position of the reading unit, and then conveys the original from the reading position to the reversing tray without reading of the original by the reading unit, so that the front and back of the original have been reversed.

3. The image reading apparatus according to claim 1, wherein the determination unit, in a case where black pixels of a predetermined number or greater are included in the reference image data corresponding to the reference plate, determines that an abnormal pixel is included.

4. The image reading apparatus according to claim 1, wherein the correction unit corrects the abnormal pixel included in the re-read original image data using pixel data of image data that is adjacent to the abnormal pixel in a main scanning direction of the re-read original image data.

5. A control method of controlling an image reading apparatus, the image reading apparatus having a reading unit and a conveying unit, the method comprising:
 a reading step of using the reading unit to read an original conveyed by the conveying unit and then to read a reference plate;
 a generation step of generating original image data corresponding to the original read in the reading step and of generating reference image data corresponding to the reference plate read in the reading step;
 a determination step of determining whether or not an abnormal pixel is included in the reference image generated in the generation step;
 a storing step of storing position information indicating a position of the abnormal pixel into a memory, in a case that is determined in the determination step that the abnormal pixel is included;
 a conveying control step responsive to a determination that an abnormal pixel is included in the reference image data, such that with respect to an original read by the reading unit just before the reference plate is read by the reading unit, the conveying control step controls to reverse surfaces of such original and controls the conveying unit to convey such original which has been reversed to a reading position of the reading unit for re-reading of the original by the reading unit; and
 a correction step of reading the original conveyed according to control in the conveying control step, generating re-read original image data corresponding to the original reread by the reading unit, and correcting the abnormal pixel included in the re-read original image data generated in the generation step with reference to the position information stored in the storing unit.

6. The control method according to claim 5, wherein reversal of the original comprises receiving the original read in the reading step on a reversing tray, then conveying the original from the reversing tray to the reading position of the reading unit, and then conveying the original from the reading position to the reversing tray without reading of the original, so that the front and back of the original have been reversed.

7. A non-transitory computer readable storage medium for storing a computer program for causing a computer of an image reading apparatus to executed the control method set forth in claim 5.

8. An image reading apparatus, comprising:
 a sheet feed tray capable of stacking a plurality of originals;
 a reading unit configured to read an original at a reading position and configured to read a reference plate when no original exists at the reading position to generate original image data corresponding to the original and reference image data corresponding to the reference plate;

a conveying unit configured to convey an original from the sheet feed tray to pass through the reading position;

a determination unit configured to determine whether or not an abnormal pixel is included in the reference image data corresponding to the reference plate;

a storing unit configured to store position information indicating a position of the abnormal pixel in a case that the determination unit determines that the abnormal pixel is included;

a conveying control unit responsive to a determination that an abnormal pixel is included in the reference image data, such that with respect to an original read by the reading unit just before the reference plate is read by the reading unit, the conveying control unit is configured to convey such original back to the reading position of the reading unit; and a correction unit configured to cause the reading unit to re-read the original conveyed by the conveying control unit, to generate re-read original image data, and to correct the abnormal pixel included in the re-read original image data with reference to the position information stored in the storing unit.

9. The image reading apparatus according to claim 8, further comprising a reversing unit configured to reverse front and back surfaces of the original passed through the reading position, wherein the conveying control unit controls the reversing unit to reverse the front and back of the original and to convey the original whose front and back have been reversed to the reading position of the reading unit.

10. The image reading apparatus according to claim 9, wherein the reversing unit receives the original read by the reading unit on a reversing tray, then conveys the original from the reversing tray to the reading position of the reading unit, and then conveys the original from the reading position to the reversing tray without reading of the original by the reading unit, so that the front and back surfaces of the original have been reversed.

11. The image reading apparatus according to claim 8, wherein the determination unit, in a case where black pixels of a predetermined number or greater are included in the reference image data corresponding to the reference plate, determines that an abnormal pixel is included.

12. The image reading apparatus according to 8, wherein the correction unit corrects the abnormal pixel included in the original image data using pixel data of image data that is adjacent to the abnormal pixel in a main scanning direction.

* * * * *